US010114716B2

United States Patent
Epstein et al.

(10) Patent No.: US 10,114,716 B2
(45) Date of Patent: Oct. 30, 2018

(54) VIRTUAL FAILURE DOMAINS FOR STORAGE SYSTEMS

(71) Applicant: International Business Machines Corporation, Armonk, NY (US)

(72) Inventors: Amir Epstein, Herzelia (IL); Michael E. Factor, Haifa (IL); Danny Harnik, Tel Mond (IL); Ronen I. Kat, Kokav-Yair (IL); Elliot K. Kolodner, Haifa (IL); Dmitry Sotnikov, Rishon-Lezion (IL)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 14/947,642

(22) Filed: Nov. 20, 2015

(65) Prior Publication Data

US 2017/0147458 A1 May 25, 2017

(51) Int. Cl.
*G06F 11/00* (2006.01)
*G06F 11/20* (2006.01)
*G06F 3/06* (2006.01)

(52) U.S. Cl.
CPC ........ *G06F 11/2097* (2013.01); *G06F 3/0619* (2013.01); *G06F 3/0647* (2013.01); *G06F 3/0683* (2013.01); *G06F 11/00* (2013.01); *G06F 2201/805* (2013.01)

(58) Field of Classification Search
CPC ........... G06F 11/2053–11/2097; G06F 3/0619; G06F 3/0647; G06F 3/0683; G06F 11/00; G06F 2201/805
See application file for complete search history.

(56) References Cited

U.S. PATENT DOCUMENTS

| 7,886,184 | B2 | 2/2011 | Hajji et al. |
| 8,032,784 | B2 | 10/2011 | Kumano et al. |
| 8,799,732 | B2 | 8/2014 | Joshi et al. |
| 9,542,296 | B1* | 1/2017 | Engers ............... G06F 11/3452 |
| 2003/0204788 | A1* | 10/2003 | Smith ................... G06F 11/008 714/47.3 |
| 2009/0307524 | A1* | 12/2009 | Kumano ............... G06F 11/008 714/6.11 |

(Continued)

OTHER PUBLICATIONS

Chaitanya Singh, C—Arrays in C programming with examples, Mar. 27, 2014, beginnersbook.com.*

(Continued)

*Primary Examiner* — Jason B Bryan
(74) *Attorney, Agent, or Firm* — William H. Hartwell

(57) ABSTRACT

A method for storage systems improvement includes collecting information that indicates one or more failure correlations for disks in a storage system. The disks are then separated into a plurality of virtual failure domains based on the indicated one or more failure correlations. The method then determines that all data objects of a set of redundant data objects are included in a first virtual failure domain. Responsive to determining that all data objects of the set of redundant data objects are included in the first virtual failure domain, the method then migrates at least one data object of the set of redundant data objects from a first disk in the first virtual failure domain to a second disk in a second virtual failure domain.

20 Claims, 6 Drawing Sheets

(56) References Cited

U.S. PATENT DOCUMENTS

| | | | | |
|---|---|---|---|---|
| 2014/0122795 | A1* | 5/2014 | Chambliss | G06F 12/16 |
| | | | | 711/114 |
| 2015/0067245 | A1* | 3/2015 | Kruger | G06F 3/0634 |
| | | | | 711/103 |
| 2015/0355971 | A1* | 12/2015 | Becker-Szendy | |
| | | | | G06F 11/1096 |
| | | | | 714/6.24 |
| 2016/0004586 | A1* | 1/2016 | Bangole | G06F 11/0793 |
| | | | | 714/15 |

OTHER PUBLICATIONS

Chapter 6—Arrays, Types, and Constants, Modula-2, Mar. 8, 2007, www.modula2.org.*
Fred Zemke, et. al., XMLTable, Mar. 24, 2006, www.wiscorp.com.*
Ronald Garcia, et al., MultiArray: a C++ library for generic programming with arrays, Published online Nov. 17, 2004 in Wiley InterScience (www.interscience.wiley.com). DOI: 10.1002/spe.630.*
Klein, Andy, "The Ultimate Hard Drive Test: What Hard Drive is Best?"; BackBlaze; May 21, 2015; Printed on: Jun. 19, 2015; pp. 1-8; <https://www.backblaze.com/blog/best-hard-drive/>.
Schroeder et al.; "Disk failures in the real world: What does an MTTF of 1,000,000 hours mean to you?"; FAST'07: 5th USENIX Conference on File and Storage Technologies; San Jose, CA; Feb. 14-16, 2007; pp. 1-16.

* cited by examiner

VIRTUAL FAILURE DOMAINS FOR STORAGE SYSTEMS

BACKGROUND

The present invention relates generally to the field of networked storage systems, and more particularly to virtual failure domains for networked storage systems.

A networked storage system is a batch of servers that are interconnected by a network (e.g., Ethernet, fiber channel, wide area network (WAN), local area network (LAN), wired or wireless, or any combination of) using a variety of connectivity protocols or media. The network connecting the storage system may be flat or hierarchical in design and the batch of servers may be physically ordered in the same computer rack, or distributed between different racks at different locations. The power supply of the storage system may include one or multiple power supply units per server, or use the same power supply for multiple servers.

Each server in a networked storage system may be connected to a single or multiple storage devices that can be represented by hard disk drives (HDD), solid-state drives (SSD), Flash Card or any other media that can be used for persistent (or non-persistent) storage of data. Storage devices can be connected directly or over just a bunch of disks (JBOD), and the connection protocols can be fiber channel, small computer system interface (SCSI), serial attached SCSI (SAS), serial AT attachment (SATA), integrated drive electronics (IDE), internet-SCSI (iSCSI), peripheral component interconnect (PCI), PCI express (PCIe), redundant array of independent disks (RAID), or any other protocols or media currently existing or to be developed in the future.

In computer networking, a failure domain encompasses a section of a network that is negatively affected when a critical device or network service experiences problems. The size of a failure domain and its potential impact depends on the device or service that is malfunctioning. For example, a router potentially experiencing problems would generally create a more significant failure domain than a network switch would. Smaller failure domains reduce the risk of disruption over a large section of a network, and ease the troubleshooting process.

SUMMARY

Embodiments of the present invention disclose a method, computer program product, and system for storage systems improvement. The method includes collecting information that indicates one or more failure correlations for disks in a storage system. The disks are then separated into a plurality of virtual failure domains based on the indicated one or more failure correlations. The method then determines that all data objects of a set of redundant data objects are included in a first virtual failure domain. Responsive to determining that all data objects of the set of redundant data objects are included in the first virtual failure domain, the method then migrates at least one data object of the set of redundant data objects from a first disk in the first virtual failure domain to a second disk in a second virtual failure domain.

DETAILED DESCRIPTION

Figure 1:
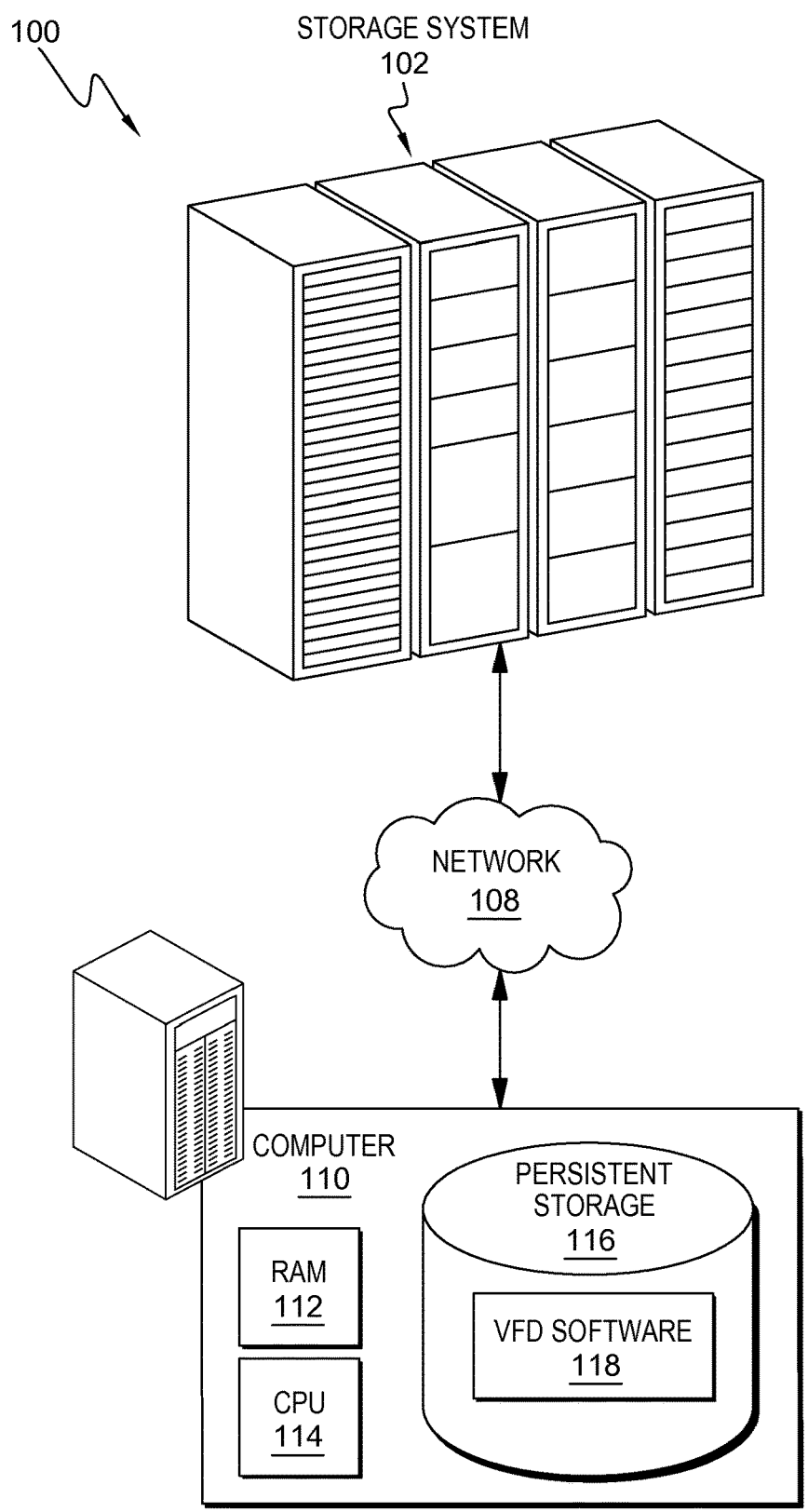
FIG. 1 is a functional block diagram illustrating a storage system environment, in an embodiment in accordance with the present invention.

Embodiments in accordance with the present invention recognize that it is common practice to store information with some level of redundancy to avoid data loss. Such redundancy can be introduced by storing several copies of the data (e.g., replicas) or by storing additional parity bits (e.g., erasure correction codes). To increase the reliability and availability of the data, the data is frequently spread, or placed, across different failure domains. For example, the data may be stored across multiple hard disks (also referred to as disks, disk drives, and hard disk drives), machines, racks or even geographically distant sites. A reason for this is that disks in similar failure domains have a higher probability of failing together, and therefore reliability and availability are diminished when replicating across disks in the same failure domain. Current methods that utilize failure domains concentrate only on physical failure domains, and address such domains in a static way.

There are existing storage solutions that distribute replicas or error correction codes across racks, nodes, or data centers. Some of these existing storage solutions, such as Hadoop Distributed File System (HDFS) make a concentrated effort to place at least one of the replicas in a different failure domain. Some solutions require that each of the replicas are in a separate failure domain. HDFS is a Java-based file system that provides scalable and reliable data storage, and it was designed to span large clusters of commodity servers.

However, existing solutions consider physical location and attachment as the only measure for failure correlation. For example, in a scenario of a "bad batch" of disks, a high frequency of media errors during writes, during a time period, may cause the replacement of thousands of SATA disks. Although an analysis of separate disk batches would have shown a clear correlation in failures, existing solutions do not provide such an analysis. Of course, this is only one example, and there are many other causes for disk failure correlation that are not addressed in current redundancy layout strategies.

Embodiments of the present invention describe a method for novel placement of data that can be used both in static and dynamic (i.e., adaptive) ways to resolve the correlated disk failure problem, extending the scope of failure domains by adding a logical failure dimension. Embodiments of the present invention add a notion of virtual (or "logical") failure domains to the existing physical failure domains. The virtual failure domains are based on a subset of a disk's properties that may be defined ahead of time or observed during the system's runtime. For example, it is known that hard disk drives of different vendors, also referred to as manufacturers, or different models, or even different batches of the same model, may have different failure rates (or "ratios"). In addition, the different failure ratios change over the life cycle of the disks, causing disks of the same vendor batch to have strong correlations in failure times. By defining, or separating, disks from the same model and age as a single virtual failure domain, and then distributing the data across different failure domains (as done for physical failure domains), software in accordance with the present invention improves the reliability of the system and reduces the probability of data loss.

Embodiments in accordance with the present invention will now be described in detail with reference to the Figures. FIG. 1 is a functional block diagram, generally designated 100, illustrating a storage system environment, in an embodiment in accordance with the present invention.

Storage system environment 100 includes storage system 102, and computer 110 interconnected over a data connection on network 108. In the example embodiment of FIG. 1, storage system 102 may be comprised of one or more computer racks containing one or more servers, interconnected via network 108 or subnets of 108. The interconnecting network(s) may be Ethernet, fiber channel, wide area network (WAN), local area network (LAN), wired or wireless, or any combination of) using a variety of connectivity protocols or media. The one or more servers may be physically ordered in storage system 102, or distributed between different racks at different locations.

Figure 2A:
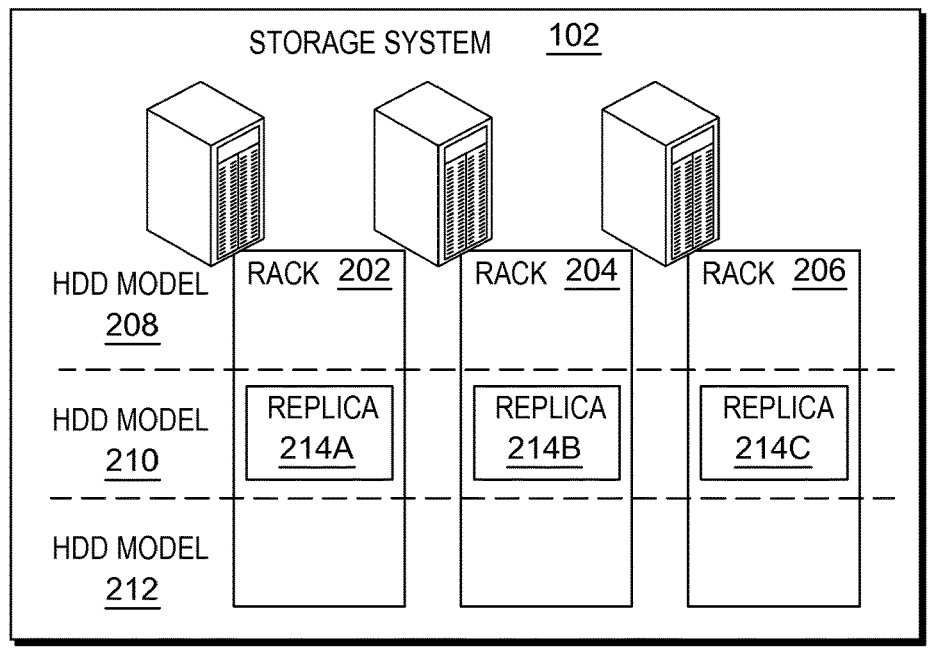
FIG. 2A is a block diagram depicting a first approach for a storage solution, within the storage system environment of FIG. 1, for placing replicas in different failure domains, in an embodiment in accordance with the present invention.

Storage system 102 may include internal and external hardware components, as depicted and described in further detail with respect to FIG. 2A.

In FIG. 1, network 108 is shown as the interconnecting fabric between storage system 102 and computer 110. In practice, network 108 may be any viable data transport network. Network 108 can be, for example, a local area network (LAN), a wide area network (WAN) such as the Internet, or a combination of the two, and can include wired, wireless, or fiber optic connections. In general, network 108 can be any combination of connections and protocols that will support communications between storage system 102 and computer 110 in accordance with an embodiment of the invention.

Storage system environment 100 also includes computer 110. Computer 110 includes random access memory (RAM) 112, central processing unit (CPU) 114, and persistent storage 116. Computer 110 may be a Web server, or any other electronic device or computing system, capable of processing program instructions and receiving and sending data. In some embodiments, computer 110 may be a laptop computer, a tablet computer, a netbook computer, a personal computer (PC), a desktop computer, a personal digital assistant (PDA), a smart phone, or any programmable electronic device capable of communicating over a data connection to network 108. In other embodiments, computer 110 may represent server computing systems utilizing multiple computers as a server system, such as in a distributed computing environment. In general, computer 110 is representative of any electronic devices or combinations of electronic devices capable of executing machine-readable program instructions and communicating with storage system 102 via network 108 and with various components and devices (not shown) within storage system environment 100.

Computer 110 includes persistent storage 116. Persistent storage 116 may, for example, be a hard disk drive. Alternatively, or in addition to a magnetic hard disk drive, persistent storage 116 may include a solid state hard drive, a semiconductor storage device, read-only memory (ROM), erasable programmable read-only memory (EPROM), flash memory, or any other computer-readable storage medium that is capable of storing program instructions or digital information. Virtual failure domain (VFD) software 118 is stored in persistent storage 116, which also includes operating system software as well as software that enables computer 110 to communicate with storage system 102, as well as other computing devices (not shown) of storage system environment 100 over a data connection on network 108.

VFD software 118 is stored in persistent storage 116 and is responsible for monitoring storage system 102 and collecting failure event data. VFD software then analyzes the data to determine any correlations between the failures, then divide the system into subsets based on the correlations. VFD software will also migrate data to ensure the no data object is fully included in a single virtual failure domain. In other example embodiments, VFD software 118 may initiate data migrations using other software components of computer 110 or storage system 102 to ensure that no data object is fully included in a single virtual failure domain. VFD software 118 will also determine placement for data objects based on current failure domains. In an alternate embodiment, VFD software 118 may reside and execute on storage system 102.

Figure 5:
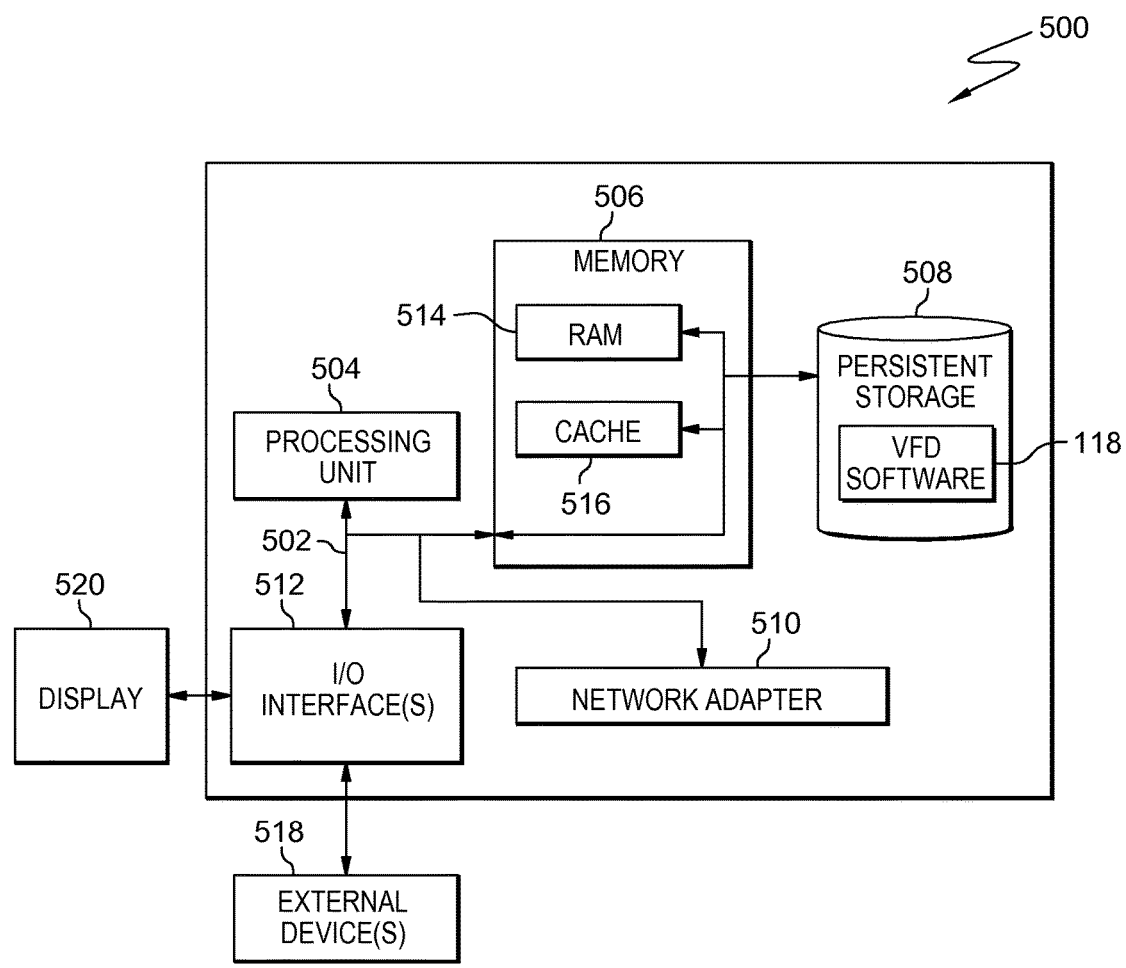
FIG. 5 depicts a block diagram of components of the computer executing the virtual failure domain software, in an embodiment in accordance with the present invention.

Computer 110 may include internal and external hardware components, as depicted and described in further detail with respect to FIG. 5.

FIG. 2A is a block diagram depicting a first approach for a storage solution, within the storage system environment of FIG. 1, for placing replicas in different failure domains, in an embodiment in accordance with the present invention. In an example embodiment, storage system 102 contains computer rack 202, also referred to as rack 202, computer rack 204, also referred to as rack 204, and computer rack 206, also referred to as rack 206. The hardware configurations for racks 202, 204, and 206 in this embodiment are identical and use HDD model 208, HDD model 210, and HDD model 212 to store data in defined failure domains. HDD models 208, 210, and 212 each have a defined failure domain as indicated by FIG. 2A. A data object is replicated across racks 202 as replica 214A, 204 as replica 214B, and 206 as replica 214C, all using HDD model 210. One method for replicating, or mirroring, replica 214A, 214B, and 214C across racks 202, 204, and 206 is disk mirroring. In data storage, disk mirroring is the replication of logical disk volumes onto separate physical hard disks in real-time to ensure continuous availability.

Figure 2B:
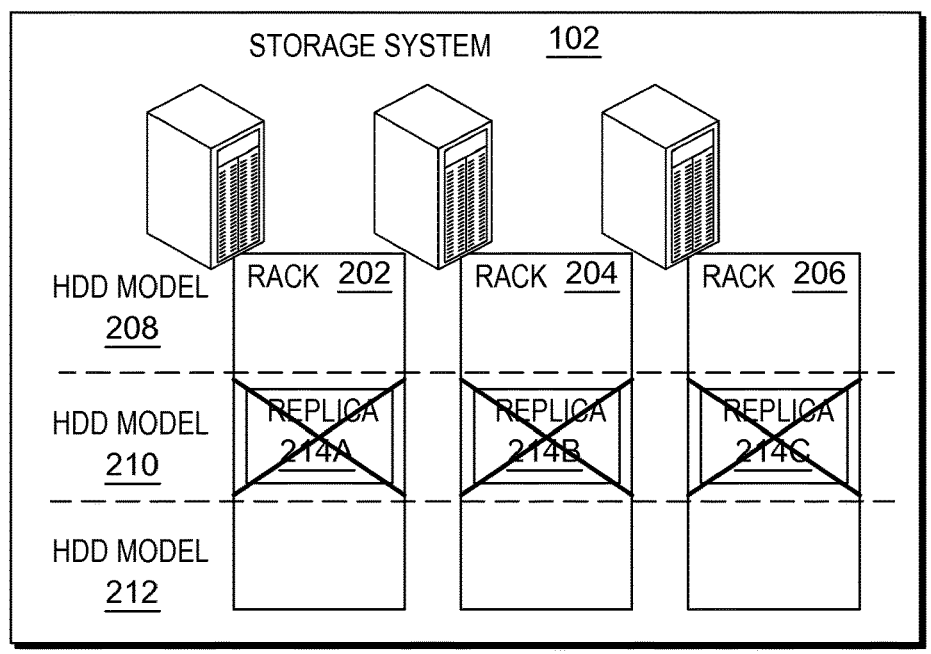
FIG. 2B is a block diagram depicting a failure across multiple failure domains for a storage solution, within the storage system environment of FIG. 1, in an embodiment in accordance with the present invention.

FIG. 2B is a block diagram depicting a failure across multiple failure domains for a storage solution, within the storage system environment of FIG. 1, in an embodiment in accordance with the present invention. Continuing with the example embodiment of FIG. 2A, where the defined failure domain using HDD model 210 experiences simultaneous disk failures across racks 202, 204, and 206 due to a bad batch of hard drives, the result is that replicas 214A, 214B, and 214C are lost across all failure domains as depicted in FIG. 2B. A disk drive failure occurs when an HDD malfunctions and the stored information cannot be accessed with a properly configured computer. A hard disk failure may occur in the course of normal operation, or due to an external factor such as exposure to fire or water or high magnetic fields, or suffering a sharp impact or environmental contamination, which can lead to a head crash. In other example embodiments, an HDD may fail because of worn out parts, or in other cases, fail prematurely. A head crash is a hard-disk failure that occurs when a read-write head of a hard disk drive comes in contact with its rotating platter, resulting in permanent and usually irreparable damage to the magnetic media on the platter surface.

Figure 2C:
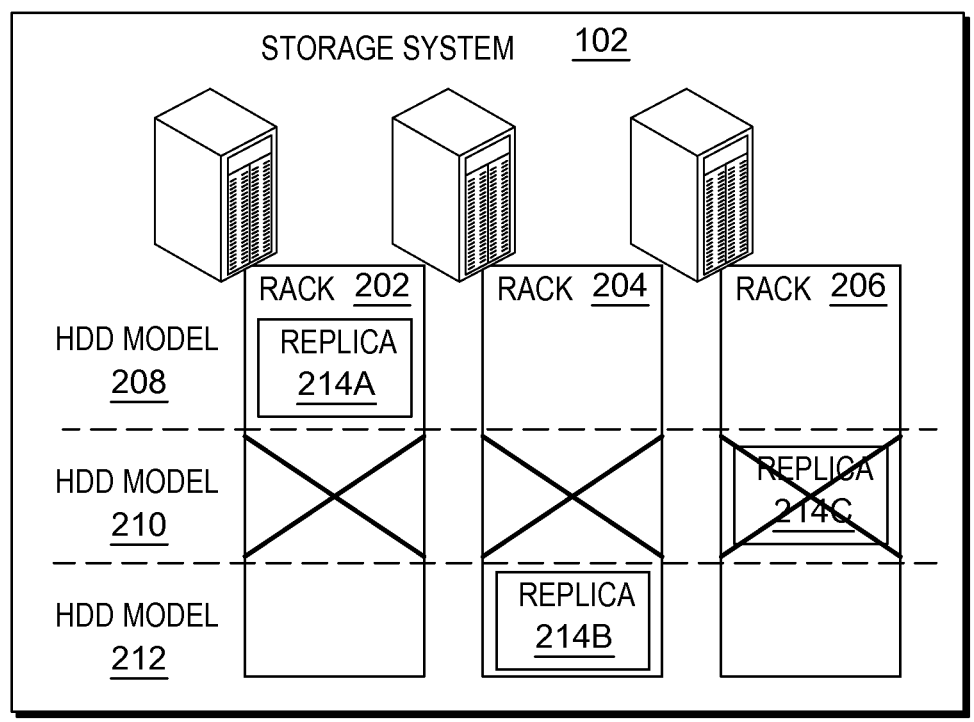
FIG. 2C is a block diagram depicting a second approach for a storage solution, within the storage system environment of FIG. 1, for extending the scope of failure domains by adding a logical failure dimension, in an embodiment in accordance with the present invention.

FIG. 2C is a block diagram depicting an improved second approach for a storage solution, within the storage system environment of FIG. 1, for extending the scope of failure domains by adding a logical failure dimension, in an embodiment in accordance with the present invention. Using the example embodiment of FIG. 2A and FIG. 2B, VFD software 118 monitors and collects data, wherein the collected data may relate to failure event data, disk properties such as vendor, model, vendor batch number, serial number, the position in the racks 202, 204, and 206, the number of read/writes, disk age, and temperature. VFD software then creates virtual failure domains by defining, separating, or associating, each disk as a vector of parameters that include the disk's physical location inside the storage environment (e.g., racks 202, 204, and 206, node, position in racks 202, 204, and 206), the disk's manufacture data (e.g., vendor, model, serial number) and the disk's performance and/or usage parameters (e.g., amount of read/writes, age, temperature, Self-Monitoring, Analysis and Reporting Technology (SMART) parameters). SMART is a monitoring system included in computer HDDs and SSDs that detects and reports on various indicators of drive reliability, with the intent of enabling the anticipation of hardware failures. Upon creating the virtual failure domains, each disk in the storage system is represented as vectors of parameters associated with the disks, wherein the parameters indicate one or more failure correlations for the disk. In other example embodiments, virtual failure domains may be discovered during the system runtime by using machine learning (ML) classification algorithms that may identify additional sub-groups with high failure ratio correlation. For example, the disk failure ratio may be dependent on temperature and vibration, but temperature and vibration inside the rack can differ based on the disk location, hence avoiding storing replicas to disks in locations with high temperature, or high vibration, may also decrease the data loss probability.

VFD software 118 distributes data objects across different failure domains by defining disks from the same model and age as a single virtual failure domain to improve the reliability of the system and reduce the probability of data loss.

Figure 3:
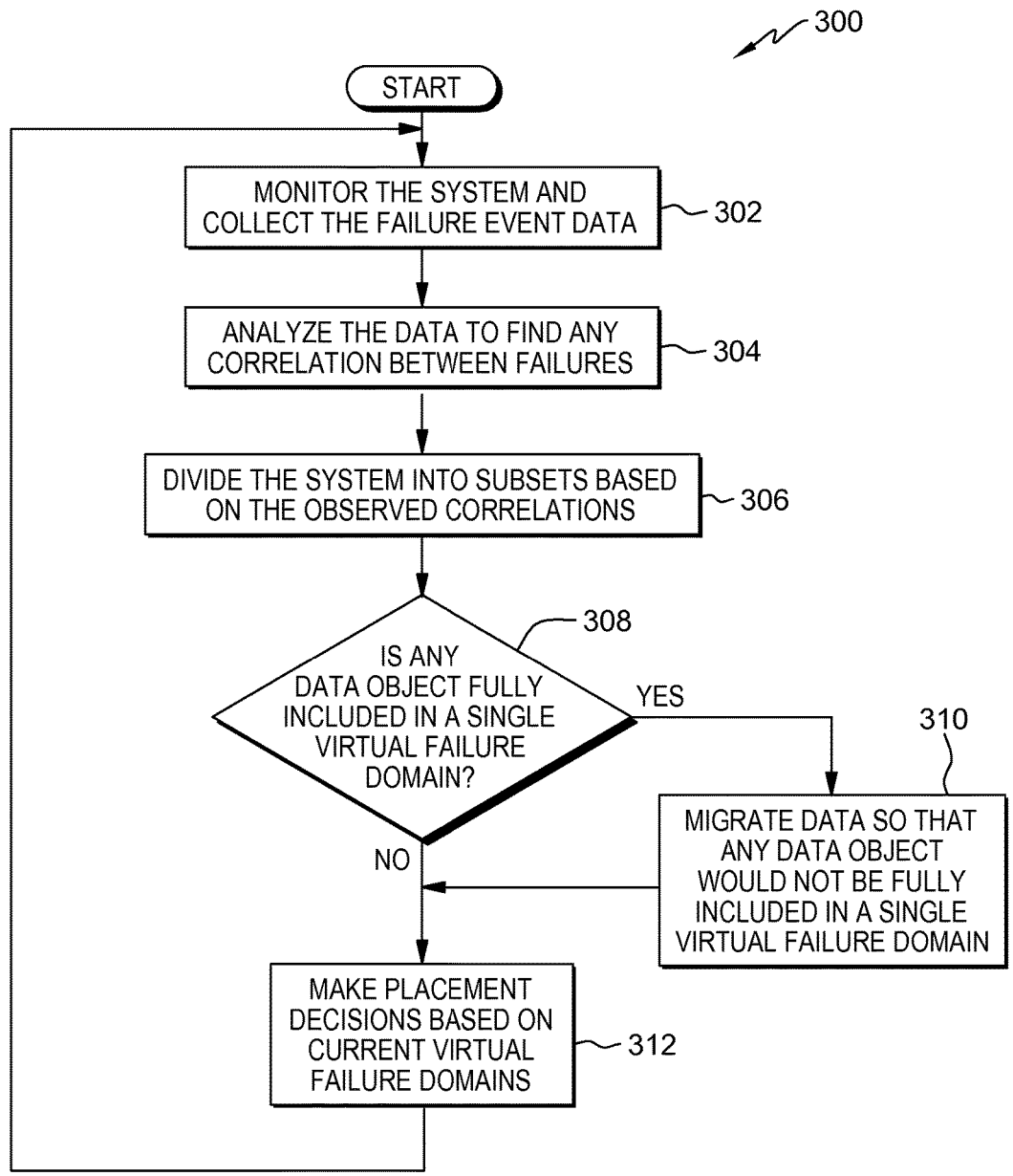
FIG. 3 is a flowchart depicting operational steps of virtual failure domain software, on a computer within the storage system environment of FIG. 1, for dividing a system into virtual failure domains and migrating data based on failures and event data, in an embodiment in accordance with the present invention.

FIG. 3 is a flowchart, generally designated 300, depicting operational steps of virtual failure domain software, on a computer within the storage system environment of FIG. 1, for dividing a system into virtual failure domains and migrating data based on failures and event data, in an embodiment in accordance with the present invention. In an example embodiment, VFD software 118 monitors storage system 102 that is comprised of rack 202, 204, and 206, to collect failure event data as depicted in step 302. Example of failure event data include: (i) a number of read/write errors for each disk, (ii) a number of head crashes, and (iii) a number of bad sectors. Other data that may be monitored and collected include: (i) the disk's physical location inside storage system 102 (e.g., rack 202, 204, and 206, node, and position at rack), (ii) the disk's manufacture data (e.g., vendor, model, and serial number), and (iii) the disk's performance and/or usage parameters (e.g., amount of read/writes, age, operating temperature, and SMART parameters).

In step 304, VFD software 118 analyzes the collected data to find any correlation between failures. For example, two or more drives may indicate high failure events, such as read/write errors as described in step 302. Upon analyzing the drive data and information, VFD software 118 may determine the drives may have the same manufacturer name, model number, and vendor batch number, also referred to as a manufacturer batch number.

VFD software 118 divides the system into subsets based on the observed correlations as depicted in step 306. Stated another way, VFD software 118 associates disks with failure domains based on their corresponding vectors. For example, VFD software 118 may create virtual failure domains based on the disks' models (e.g., HDD model 210), and age.

In decision step 308, VFD software determines if any data object is fully included in a single virtual failure domain. If a data object is found to be entirely included in a single virtual failure domain ("Yes" branch, decision 308), VFD software 118 then migrates the data so that any data object would not be fully included in a single virtual failure domain as depicted in step 310. For example, VFD software 118 analyzes storage system 102 and determines a data object resides in racks 202 as replica 214A, 204 as replica 214B, and 206 as replica 214C, all using HDD model 210. VFD software 118 then migrates the data object to ensure the data object is not fully contained in the virtual failure domain for HDD model 210. If a data object is not found to be entirely included in a single virtual failure domain ("No" branch, decision 308), VFD software 118 will make further placement decisions based on current virtual failure domains as depicted in step 312.

VFD software 118 then repeats steps 302 through 312 as depicted in FIG. 3.

Figure 4:
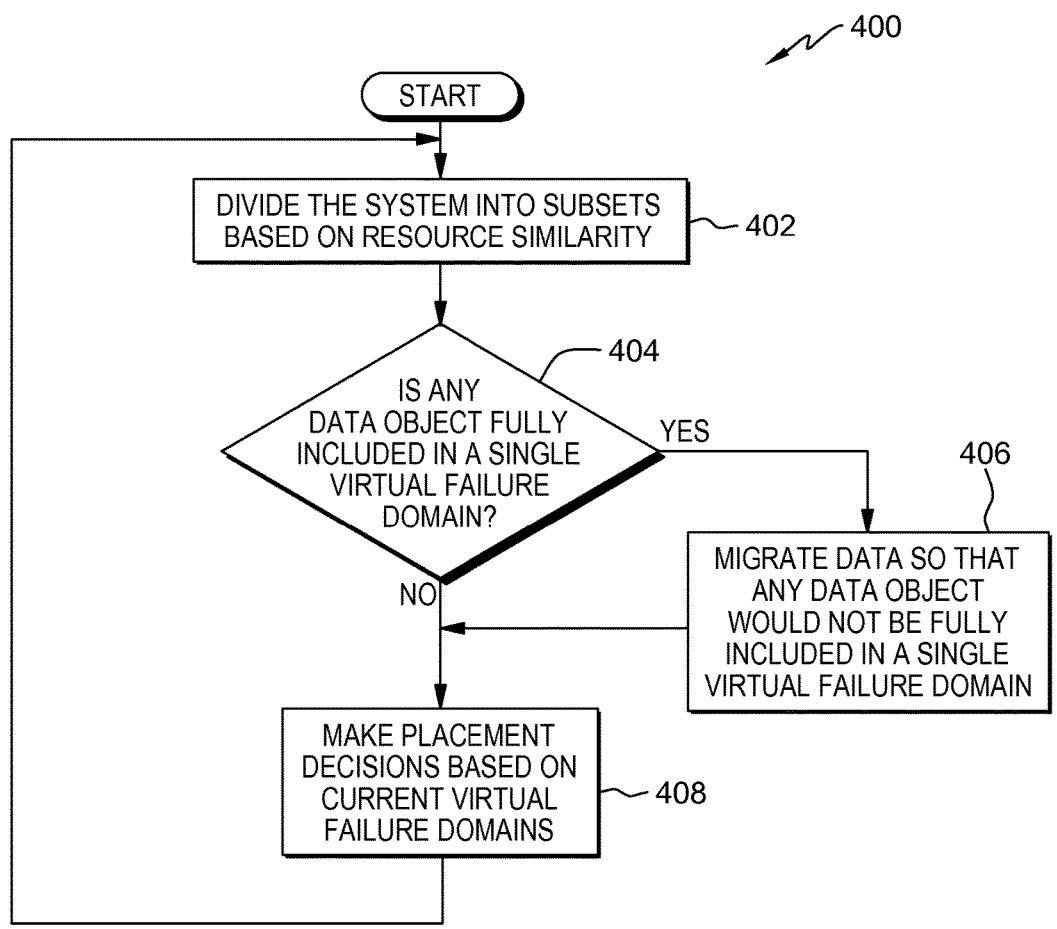
FIG. 4 is a flowchart depicting operational steps of a virtual failure domain software, on a computer within the storage system environment of FIG. 1, for dividing a system into virtual failure domains and migrating data based on resource similarity, in an embodiment in accordance with the present invention.

FIG. 4 is a flowchart, generally designated 400, depicting operational steps of a virtual failure domain software, on a computer within the storage system environment of FIG. 1, for dividing a system into virtual failure domains and migrating data based on resource similarity, in an embodiment in accordance with the present invention. In this example embodiment, VFD software 118 divides storage system 102 into subsets based on resource similarity as depicted in step 402. Data used to determine resource similarity may include: (i) the disk's manufacture, (ii) the disk's model number, (iii) the disk's serial number, (iv) the disk's size, (v) the disk's platter speed (e.g., revolutions per minute (RPM), and (vi) the disk's connection interface.

In decision step 404, VFD software determines if any data object is fully included in a single virtual failure domain. If a data object is found to be entirely included in a single virtual failure domain ("Yes" branch, decision 404), VFD software 118 then migrates the data so that any data object would not be fully included in a single virtual failure domain as depicted in step 406. If a data object is not found to be entirely included in a single virtual failure domain ("No" branch, decision 404), VFD software 118 will make further placement decisions based on current virtual failure domains as depicted in step 408.

VFD software 118 then repeats steps 402 through 408 as depicted in FIG. 4.

FIG. 5 depicts a block diagram, generally designated 500, of components of the computer executing the virtual failure domain software, in an embodiment in accordance with the present invention. It should be appreciated that FIG. 5 provides only an illustration of one implementation and does not imply any limitations with regard to the environments in which different embodiments may be implemented. Many modifications to the depicted environment may be made.

Computer 110 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

VFD software 118 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of network 108, rack 202, rack 204, rack 206, and computer 110. In these examples, communications unit 510 includes one or more network interface cards. Communications unit 510 may provide communications through the use of either or both physical and wireless communications links. VFD software 118 may be downloaded to persistent storage 508 through communications unit 510.

I/O interface(s) 512 allows for input and output of data with other devices that may be connected to computer 110. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., VFD software 118, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    collecting, by one or more processors, information that indicates one or more failure correlations for disks in a storage system;
    defining, by one or more processors, each disk as a vector of parameters associated with the respective disk, wherein the parameters are based on the information that indicates one or more failure correlations, and wherein the parameters for each respective disk include the respective disk's physical location inside the storage system, the respective disk's manufacture data, and the respective disk's performance/usage parameters, wherein the performance/usage parameters include a number of head crashes and a number of bad sectors;
    separating, by one or more processors, the disks into a plurality of virtual failure domains based on the parameters of their corresponding vectors;
    determining, by one or more processors, that all data objects of a set of redundant data objects are included in a first virtual failure domain; and
    responsive to determining that all data objects of the set of redundant data objects are included in the first virtual failure domain, migrating, by one or more processors, at least one data object of the set of redundant data objects from a first disk in the first virtual failure domain to a second disk in a second virtual failure domain.

2. The method of claim 1, wherein the manufacture data includes the following:
    a manufacturer name;
    a model number;
    a manufacturer batch number; and
    a serial number.

3. The method of claim 1, wherein the physical location of a respective disk inside the storage system includes a position of the respective disk in a rack; and
    the performance/usage parameters of a respective disk further include a disk age.

4. The method of claim 1, wherein the performance/usage parameters of a respective disk further include the following:
    a number of read/writes for the disk;
    an operating temperature; and
    a number of read/write errors.

5. The method of claim 4, wherein the performance/usage parameters of a respective disk further include Self-Monitoring, Analysis, and Reporting Technology (SMART) parameters.

6. The method of claim 1, wherein the virtual failure domains are determined during a system runtime by using machine learning (ML) classification algorithms configured to identify groups based on failure ratio correlations.

7. The method of claim 1, further comprising:
    discovering, by one or more processors, one or more sub-groups of the plurality of virtual failure domains during runtime; and
    separating, by one or more processors, one or more of the disks into the one or more sub-groups.

8. A computer program product for storage systems improvement, the computer program product comprising:

one or more computer readable storage media and program instructions stored on the one or more computer readable storage media, the program instructions comprising:

program instructions to collect information that indicates one or more failure correlations for disks in a storage system;

program instructions to define each disk as a vector of parameters associated with the respective disk, wherein the parameters are based on the information that indicates one or more failure correlations, and wherein the parameters for each respective disk include the respective disk's physical location inside the storage system, the disk's manufacture data, and the respective disk's performance/usage parameters, wherein the performance/usage parameters include a number of head crashes and a number of bad sectors;

program instructions to separate the disks into a plurality of virtual failure domains based on the parameters of their corresponding vectors;

program instructions to determine that all data objects of a set of redundant data objects are included in a first virtual failure domain; and program instructions to, responsive to determining that all data objects of the set of redundant data objects are included in the first virtual failure domain, migrate at least one data object of the set of redundant data objects from a first disk in the first virtual failure domain to a second disk in a second virtual failure domain.

9. The computer program product of claim 8, wherein the manufacture data includes the following:
a manufacturer name;
a model number;
a manufacturer batch number; and
a serial number.

10. The computer program product of claim 8, wherein:
the physical location of a respective disk inside the storage system includes a position of the respective disk in a rack; and
the performance/usage parameters of a respective disk further include a disk age.

11. The computer program product of claim 8, wherein the performance/usage parameters of a respective disk further include the following:
a number of read/writes for the disk;
an operating temperature; and
a number of read/write errors.

12. The computer program product of claim 11, wherein the performance/usage parameters of a respective disk further include Self-Monitoring, Analysis, and Reporting Technology (SMART) parameters.

13. The computer program product of claim 8, wherein the virtual failure domains are determined during a system runtime by using machine learning (ML) classification algorithms configured to identify groups based on failure ratio correlations.

14. The computer program product of claim 8, further comprising:
program instructions to discover one or more sub-groups of the plurality of virtual failure domains during runtime; and
program instructions to separate one or more of the disks into the one or more sub-groups.

15. A computer system for storage systems improvement, the computer system comprising:
one or more computer processors;
one or more computer readable storage media;
program instructions stored on the computer readable storage media for execution by at least one of the one or more processors, the program instructions comprising:

program instructions to collect information that indicates one or more failure correlations for disks in a storage system;

program instructions to define each disk as a vector of parameters associated with the respective disk, wherein the parameters are based on the information that indicates one or more failure correlations, and wherein the parameters for each respective disk include the respective disk's physical location inside the storage system, the respective disk's manufacture data, and the respective disk's performance/usage parameters, wherein the performance/usage parameters include a number of head crashes and a number of bad sectors;

program instructions to separate the disks into a plurality of virtual failure domains based on the parameters of their corresponding vectors;

program instructions to determine that all data objects of a set of redundant data objects are included in a first virtual failure domain; and program instructions to, responsive to determining that all data objects of the set of redundant data objects are included in the first virtual failure domain, migrate at least one data object of the set of redundant data objects from a first disk in the first virtual failure domain to a second disk in a second virtual failure domain.

16. The computer system of claim 15, wherein the manufacture data includes the following:
a manufacturer name;
a model number;
a manufacturer batch number; and
a serial number.

17. The computer system of claim 15, wherein the performance/usage parameters of a respective disk further include the following:
a number of read/writes for the disk;
an operating temperature; and
a number of read/write errors.

18. The computer system of claim 17, wherein the performance/usage parameters of a respective disk further include Self-Monitoring, Analysis, and Reporting Technology (SMART) parameters.

19. The computer system of claim 15, wherein the virtual failure domains are determined during a system runtime by using machine learning (ML) classification algorithms configured to identify groups based on failure ratio correlations.

20. The computer system of claim 15, further comprising:
program instructions to discover one or more sub-groups of the plurality of virtual failure domains during runtime; and
program instructions to separate one or more of the disks into the one or more sub-groups.

* * * * *